Aug. 21, 1928.

S. H. BROOKS 1,681,697

SAFETY VALVE FOR STORAGE TANKS

Filed Aug. 17, 1925

Stephen H Brooks Inventor

N. S Anstutz

By

Attorney

Patented Aug. 21, 1928.

1,681,697

UNITED STATES PATENT OFFICE.

STEPHEN H. BROOKS, OF LOS ANGELES, CALIFORNIA, ASSIGNOR TO BROOKS ENGINEERING CORPORATION, A CORPORATION OF CALIFORNIA.

SAFETY VALVE FOR STORAGE TANKS.

Application filed August 17, 1925. Serial No. 50,633.

My invention relates to improvements in safety valves for storage tanks and it more especially consists of the features pointed out in the annexed claims.

The purpose of my invention is to provide a safety valve that is extremely simple; that is very economical to construct; that has an amplified capacity compared with such devices as hitherto made; that eliminates the friction inherently present in the usual form of pipe-fitting bends heretofore used; that utilizes extremely light weight valve disks; and that increases the areas of the valve openings about 50% over the area of the tank connection which reduces the internal friction to a minimum.

With these and other ends in view, I illustrate in the accompanying drawing such instances of adaptation as will disclose the broad underlying features of my invention without limiting myself to the specific details shown thereon and described herein.

Figure 1:
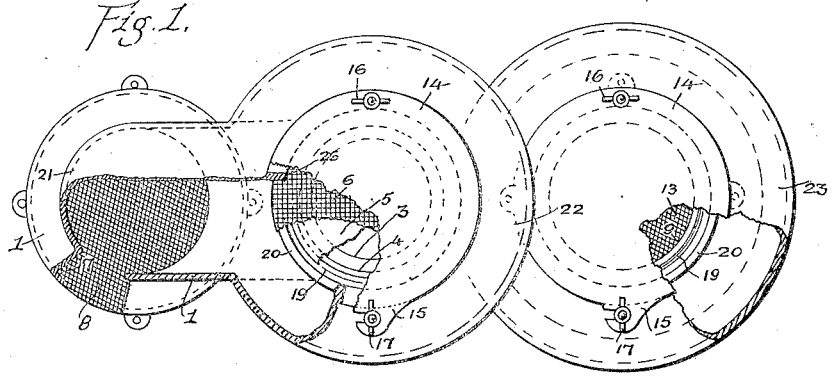
Figure 1 is a top plan view partly in section.

It has heretofore been the practice to build safety vents with separable parts having machined faces and numerous bolts to hold them assembled. In my present construction these expensive features are entirely eliminated. About the only machining there is left is on the face of the foot, the valve seats and the cover openings.

I have found that the conventional type of pipe fitting bends hertofore used reduce the capacity of safety vents very much; in fact, vents having the same cross sectional inlet and outlet areas made with pipe fitting bends or my improved curved connections show a large increase in efficiency in favor of my construction, a result that has not been reached heretofore.

The outstanding features of my invention, regardless of the specific details of construction, reside in the fact that I have provided curved passage walls of large radius that are theoretically correct so as to insure a maximum capacity of flow through the valves in either direction without undue resistance to the flow and without causing positive or negative pressures to be built up through the inertia of slowly acting valves. By making the valve openings about 50% larger in area than the tank opening, I add to the efficiency of the curved inner wall flow surfaces, and by reason of this prevent an increase of pressure resistance or cut down capacity flow which will inevitably exist when the valve opening has the same area or less than the tank connection.

My aluminum disk valves have very little inertia and the shallow lip or flange formed around their circumference cooperate with the mercury seal into which they dip. These shallow lips do not impede flow through the valves, as is found to be the case in valves having lips or flanges of practically the same length as the diameter of the valve. In addition, the mercury seal grooves are raised above the body casing so as to allow complete drainage of any condensation that may take place. The very thin aluminum valve disks are held in operative relation by suitable wire cages placed above them.

In practically carrying out my invention, I form my safety relief valve of a single casting 1. This casting has a flanged foot 2 in which an opening 3 is formed to connect with any desired fitting secured to the tank (not shown). Directly above the opening 3 an enlarged pressure opening 4 is formed. Immediately above the pressure opening 4 an inspection opening 26 is made in the casing 1. This opening is for inspection purposes and to allow access to the pressure valve 5 and the valve cage 6. It is closed by a horizontally swinging cover 14 which is pivoted on a stud where it is held by a wing nut 16. It has a slotted projection 15 which engages another stud on which the wing nut 17 is threaded. The two wing nuts 16 and 17 serve to tightly clamp the covers 14 over the openings 26.

Figure 2:
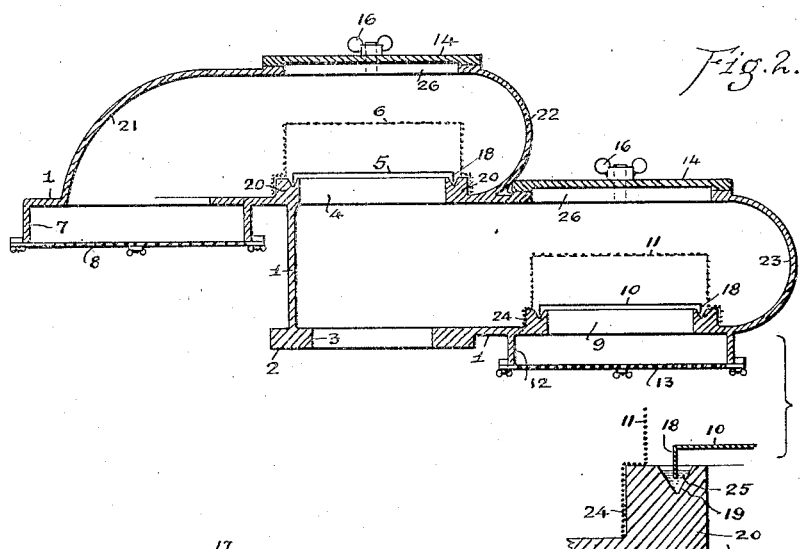
Fig. 2 is an elevation in section on the center line of Fig. 1.

From Fig. 2 it will be seen that there are two inspection openings 26 having duplicate covers 14. As previously stated, one of the openings 26 is above the pressure valve 5, but the other opening 26 is above the vacuum valve 10. The pressure valve 5 and the vacuum valve 10, as well as their respective wire cages 6 and 11, are duplicates of each other. Both valve disks have flanges 18 that are shallow or narrow and of little depth which dip into the mercury seal 25 contained in the annular V grooves 19. The V grooves are formed in the upper face of the raised flanges 20. Any condensation that may take place around the flanges 20 will not affect the operation of the stemless aluminum valves 5 and 10. The valve 10 controls the vacuum openings 9 and the vacuum exit 12. The screen cages 6 and 11 have flanged feet 24 that rest on the flanges 20 so as to be held in position above the valves 5 and 10. The pressure exit is formed at 7. The exits 7 and 12 are respectively covered by screens 8 and 13 which prevent the ingress of dirt, bugs, and foreign matter.

The valves 5 and 10 are, as stated, made of aluminum and their operation is controlled entirely by their own weight so as to respond to initial pressures from one-tenth of an ounce upward. The wire cages 6 and 11, as already stated, serve to prevent the valves 5 and 10 from being displaced when opened, and to insure these valves being properly reseated when the pressure is relieved.

The side wall 23 of the vacuum chamber is curved outwardly, as shown in Fig. 2, and the side wall 22 of the pressure chamber is similarly curved outward on all sides so as to provide ample expansion area and direct either positive or negative flow in natural curves to thereby overcome internal surface friction. The outlet from the pressure chamber also has a curved wall 21 of large radius for the same purpose.

It will be seen that my construction is extremely simple requiring a minimum number of machining operations and being made of relatively thin walls is not excessive in weight. Heretofore devices of this type have been made with heavy walls and with relatively sharp bends to the several passages that presented a very large increase of surface friction which reduced the sensitivity of the control.

Figure 3:
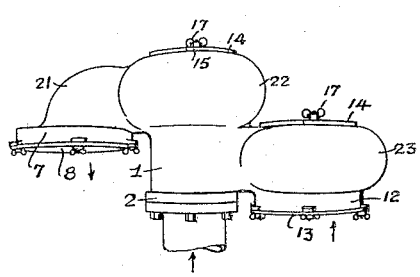
Fig. 3 is an external perspective view showing the round edged casing.

It is found that my present construction having the rounded edges, as shown in Figs. 2 and 3, on account of the scientific formation of these edges which produce the internal curved flow surfaces show an efficiency of 90%, whereas valves made without such curved flow surfaces only have practical efficiencies of from 10 to 40%.

What I claim is:

1. In safety valves for tanks, a suitable casing having an inlet for attachment to a tank opening, a shallow flanged sheet metal pressure stemless valve of minimum of weight, a similarly formed vacuum valve of minimum weight in operative relation to the inlet, a separate V-grooved seat for each valve, a mercury sealing agent in the grooves, recurving walls adjacent the said valves presenting internal curved flow surfaces, said body having a pressure outlet connected to the pressure valve, a vacuum inlet to the vacuum valve and means positioned adjacent the valves and disconnected therefrom adapted to prevent an inoperative displacement of said valves.

2. In safety valves for tanks, a casing having an inlet opening for connection to a tank, a pair of light weight duplicate shallow flanged stemless valve disks within the casing, grooved seats for the valves containing a mercury sealing agent, internal flow surfaces curved in two different planes adjacent the said valves and means extraneous of said valves adapted to insure their being reseated after having been in movement.

3. In safety valves for tanks, a casing, a pair of V-shaped annular grooved valve seats within the casing, a pair of thin aluminum shallow-lipped valve disks positioned above the V grooves, a mercury seal in the grooves, and wire cages positioned above the valves to prevent their displacement and insure their being operatively reseated.

4. In safety valves for tanks, a casing, an internal raised flange having an annular groove formed therein, a mercury seal in the groove, a thin sheet aluminum valve, a shallow flange formed on the valve adapted to engage the mercury seal, and a wire cage of larger diameter than the valve spaced apart from the top of the valve said cage being supported on the raised flange.

5. In safety valves for tanks, a casing, a pair of annular grooved valve seats within the casing, a pair of thin aluminum shallow-lipped valve disks positioned above the grooves, a mercury seal in the grooves, and means positioned above the valves and disconnected therefrom adapted to prevent their displacement and insure their being operatively reseated.

In testimony whereof I affix my signature.

STEPHEN H. BROOKS.